US012334699B2

(12) United States Patent
Chen

(10) Patent No.: US 12,334,699 B2
(45) Date of Patent: Jun. 17, 2025

(54) INSERT MOLDED CONNECTOR

(71) Applicant: Ying Hao Technology CO., LTD., New Taipei (TW)

(72) Inventor: Chih-Jung Chen, New Taipei (TW)

(73) Assignee: Ying Hao Technology Co., Ltd., New Taipei (TW)

( * ) Notice: Subject to any disclaimer, the term of this patent is extended or adjusted under 35 U.S.C. 154(b) by 355 days.

(21) Appl. No.: 18/052,919

(22) Filed: Nov. 6, 2022

(65) Prior Publication Data

US 2023/0163547 A1 May 25, 2023

(30) Foreign Application Priority Data

Nov. 19, 2021 (TW) ................................ 110213771

(51) Int. Cl.
*H01R 43/24* (2006.01)
*H01R 12/72* (2011.01)
*H01R 107/00* (2006.01)

(52) U.S. Cl.
CPC ........... *H01R 43/24* (2013.01); *H01R 12/722* (2013.01); *H01R 2107/00* (2013.01); *H01R 2201/04* (2013.01)

(58) Field of Classification Search
CPC .. H01R 43/24; H01R 12/722; H01R 2107/00; H01R 2201/04; H01R 12/77; H01R 24/60; H01R 13/405
See application file for complete search history.

(56) References Cited

U.S. PATENT DOCUMENTS

| | | | | |
|---|---|---|---|---|
| 6,376,773 | B1 * | 4/2002 | Maegawa | H01R 12/63<br>174/117 F |
| 8,011,950 | B2 * | 9/2011 | McGrath | H01R 13/6594<br>439/497 |
| 8,235,731 | B1 * | 8/2012 | Poulsen | H01R 13/6466<br>439/76.1 |
| 8,251,730 | B2 * | 8/2012 | Wu | H01R 13/6275<br>439/345 |
| 8,834,185 | B2 * | 9/2014 | Wu | H01R 13/6658<br>439/76.1 |
| 8,928,849 | B2 * | 1/2015 | Horino | G02F 1/13452<br>349/149 |
| 9,017,088 | B2 * | 4/2015 | Endo | H01R 9/00<br>439/276 |
| 9,017,092 | B1 * | 4/2015 | McCracken | H01R 13/648<br>439/39 |
| 9,166,320 | B1 * | 10/2015 | Herring | H01R 12/79 |
| 9,203,171 | B2 * | 12/2015 | Yu | H01R 12/73 |
| 9,203,193 | B2 * | 12/2015 | Hackman | H01R 13/648 |
| 9,306,334 | B2 * | 4/2016 | Zhu | H01R 13/6471 |
| 9,437,949 | B2 * | 9/2016 | Behziz | H01R 12/716 |
| 10,103,465 | B2 * | 10/2018 | Amini | H01R 12/73 |
| 10,205,256 | B2 * | 2/2019 | Wu | H01R 12/7005 |
| 10,381,783 | B2 * | 8/2019 | Zhou | H01R 13/6658 |

(Continued)

*Primary Examiner* — Harshad C Patel

(57) ABSTRACT

An insert molded connector includes a plurality of wires arranged in parallel, a coating insulating layer, and a tongue. The plurality of wires are configured to transmit electrical signals. The coating insulating layer covers main portions of the wires to expose the contact portions of the wires. The tongue is insert molded to cover the contact portion and a portion of the coating insulating layer close to the contact portion to expose a contact surface of the contact portion.

13 Claims, 8 Drawing Sheets

(56) References Cited

U.S. PATENT DOCUMENTS 10,905,004 B2 * 1/2021 Holec .................... H05K 1/113
12,155,144 B2 * 11/2024 Nagayama ............. H01R 11/05
2006/0028504 A1 * 2/2006 Silverbrook ......... B41J 2/16505 347/29
2011/0012859 A1 * 1/2011 Lai .......................... G06F 3/045 345/174
2011/0136368 A1 * 6/2011 Wu .................... H01R 13/6658 439/345
2011/0237112 A1 * 9/2011 Wu .................... H01R 13/6658 439/358
2011/0250778 A1 * 10/2011 Wu .................... H01R 13/6272 439/345
2012/0149243 A1 * 6/2012 Ohnishi ................. H01R 43/24 29/883
2013/0217261 A1 * 8/2013 Chen .................... H01R 13/516 439/499
2013/0337694 A1 * 12/2013 Chen .................... H01R 13/665 439/637
2014/0000927 A1 * 1/2014 Hashimoto .......... H01B 7/0018 174/68.2
2014/0235095 A1 * 8/2014 Jones ..................... H01R 24/60 439/449
2015/0038004 A1 * 2/2015 Yu .......................... H01R 12/73 439/502
2015/0255904 A1 * 9/2015 Ito ........................ H01R 12/721 439/88
2016/0372853 A1 * 12/2016 Kono ................... H01R 13/405
2017/0012370 A1 * 1/2017 Hamaguchi ............ C09J 167/00
2018/0115095 A1 * 4/2018 Zhu ...................... H01R 12/592
2018/0212364 A1 * 7/2018 Huang ................... H01R 13/26
2018/0268959 A1 * 9/2018 Kim .................... B60R 16/0215
2020/0295497 A1 * 9/2020 Suzuki ................... H01R 43/24
2020/0313345 A1 * 10/2020 Muronoi .............. H05K 5/0069
2020/0343674 A1 * 10/2020 Nogawa ............... H01R 13/502
2021/0249803 A1 * 8/2021 Kojima ................ H01B 7/0225
2021/0249804 A1 * 8/2021 Chin ...................... H01R 12/79
2023/0163547 A1 * 5/2023 Chen ...................... H01R 12/77 439/345

* cited by examiner

INSERT MOLDED CONNECTOR

CROSS REFERENCE TO RELATED APPLICATION

This application claims the priority of Taiwanese Patent Application No. 110213771, entitled "INSERT MOLDED CONNECTOR", filed on Nov. 19, 2021, the disclosure of which is incorporated herein by reference in its entirety.

FIELD OF THE DISCLOSURE

The present disclosure relates to an insert molded connector, and more particularly, to an insert molded connector with a simple structure and high reliability.

BACKGROUND

The conventional data transmission conductor cables can be used to connect two electronic devices or two circuit boards for high-frequency data transmission, such as flexible flat cables (FFC) or flexible printed circuit board (Flexible Printed Circuit Cable). Single-sided, double-sided, or multi-layer flexible printed circuit board cables can be manufactured by etching the base material that has been coated with copper. Flexible flat cables could be manufactured by using automated equipments to laminate insulating material layers and extremely thin flat conductors. Flexible flat cables can be mass-produced in an automated production, and the distance between conductors can be precisely adjusted by the settings of the machine and the jig. Therefore, it is very suitable for the control of high-frequency signal transmission, and the flexible flat cable has the characteristics of neatly arranged cores, large transmission capacity, flat structure, small size and better flexibility and can be flexibly applied to various electronic products, as a data transmission conductor cable.

In the case that the insulating material is used as a coating insulating layer in a very thin transmission wire, when a flexible flat cable is made by laminating by automated equipments, the wires of the flexible flat cable are arranged in parallel and then the upper and lower layers of the covering insulation layer are glued together by the adhesive layer, so that the upper and lower layers of the covering insulation layer covers the parallel-arranged wires therein and the contact portions of the wires are exposed.

However, in the manufacturing process of the flexible flat cable, when the tongue is formed by insert molding, the tongue cannot have any contact with the coating insulating layer because the high temperature of the insert molding process will affect the characteristics of the insulating layer or even damage the insulating layer. Therefore, the conventional flexible flat cable manufacturing process first performs insert molding process on the contact portion (transmission terminal). That is, the tongue portion is completed first. And then, the contact portion (transmission terminal) is welded to the welding portion of the multiple wires with the coated insulating layer.

As long as the high-frequency transmission of electronic signals passes through a medium conversion (such as one more solder joint in the connector), the loss of the signal increases. Therefore, the conventional connector structure not only has many components, but also increases the difficulty of realizing high reliability.

As the demands for light, thin, short, and affordable connectors increase, it is necessary to improve the high-frequency signal transmission performance. Therefore, the connector design with a simple structure and a high reliability is required. Therefore, this is an issue that the present disclosure creation would like to solve here.

SUMMARY

One objective of an embodiment of the present disclosure is to provide an insert molded connector with a simple structure and a high reliability, in order to solve the above-mentioned issues.

According to an embodiment of the present disclosure, an insert molded connector is disclosed. The insert molded connector comprises a plurality of wires arranged in parallel, a coating insulating layer, and a tongue. The plurality of wires are configured to transmit electrical signals. The coating insulating layer covers main portions of the wires to expose the contact portions of the wires. The tongue is insert molded to cover the contact portion and a portion of the coating insulating layer close to the contact portion to expose a contact surface of the contact portion.

According to an embodiment of the present disclosure, the wires are a plurality of flat conductors.

According to an embodiment of the present disclosure, a main portion of the wires is a plurality of circular conductors, and the contact portion of the wires is a flat conductor.

According to an embodiment of the present disclosure, the wires further comprise an end portion, which is not parallel to the contact portion, so as to be embedded in the tongue portion during insert-molding.

According to an embodiment of the present disclosure, the coating insulating layer comprises an upper coating film layer and a lower coating film layer.

According to an embodiment of the present disclosure, a portion of the coating insulating layer close to the contact portion comprises at least one fixing through hole, so that the tongue is insert-molded in the at least one fixing through hole.

According to an embodiment of the present disclosure, a portion of the coating insulating layer close to the contact portion comprises at least one fixing through notch, so that the tongue is insert-molded in the at least one fixing through notch.

According to an embodiment of the present disclosure, the tongue further comprises engaging portions located on both sides.

According to an embodiment of the present disclosure, the tongue further comprises a contact opening, configured to expose the contact surface of the contact portion during insert-molding.

According to an embodiment of the present disclosure, the coating insulating layer further comprises positioning notches on both sides.

According to an embodiment of the present disclosure, the upper coating film layer and the lower coating film layer are formed by thermocompression to cover the main portion of the wires.

According to an embodiment of the present disclosure, a withstand temperature of the coating insulating layer is higher than an insert-molding temperature of the tongue.

According to an embodiment of the present disclosure, a material of the coating insulating layer is selected from polyester, polyimide, polyethylene, polypropylene, polytetrafluoroethylene, acrylic or liquid crystal polymer plastics.

According to an embodiment of the present disclosure, a material of the tongue is selected from polyester, polyimide, polyethylene, polypropylene, polytetrafluoroethylene, acrylic or liquid crystal polymer plastics.

In contrast to the conventional art, the insert molded connector of the present disclosure can maintain the original physical, chemical and electrical characteristics by implementing the insert molding process due to the high temperature resistance of the insulating layer. While directly forming the tongue that covers and holds the contact portion and the partial coating insulating layer, there is no need to insert molding the independent contact portion (transmission terminal) first. That is, the tongue is completed first, and then the transmission contact (transmission terminal) is welded to the welding portion of the flexible flat cable with the coating insulating layer, so as to create an insert molding connector with a very simple structure and high reliability.

To make the above-mentioned content of this disclosure easier to understand, the following is a detailed description of preferred embodiments in conjunction with the accompanying drawings.

DETAILED DESCRIPTION

The realization of the purpose of the present embodiments, the functional characteristics, and advantages will be further explained in conjunction with the embodiments and with reference to the accompanying drawings.

Spatially relative terms, such as “beneath”, “below”, “lower”, “above”, “upper” and the like, may be used herein for ease of description to describe one element or feature’s relationship to another element(s) or feature(s) as illustrated in the figures. It will be understood that the spatially relative terms are intended to encompass different orientations of the device in use or operation in addition to the orientation depicted in the figures.

Figure 1:
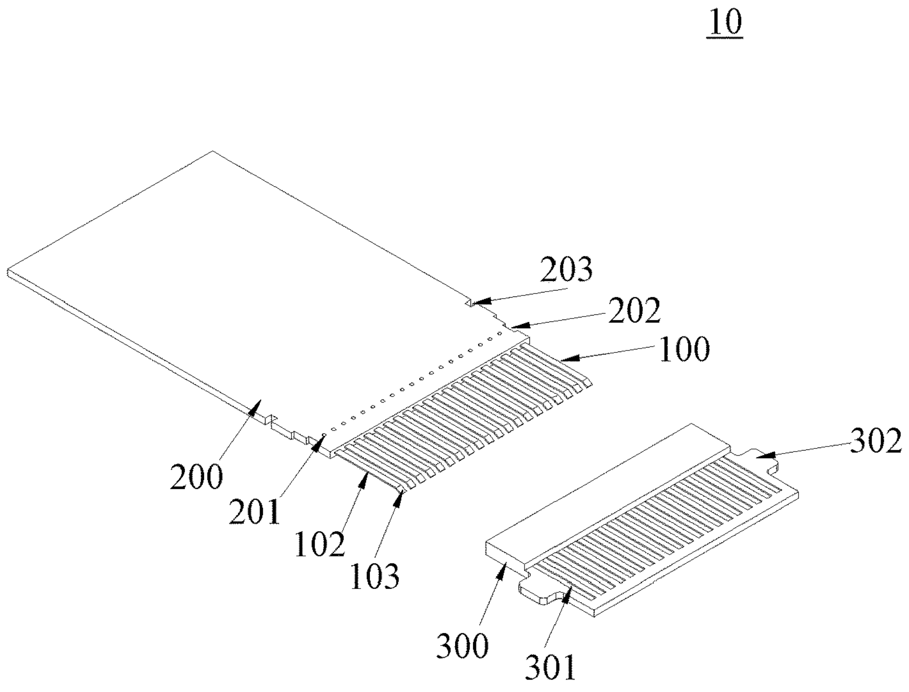
FIG. 1 is a diagram of an insert molded connector according to a first embodiment of the present disclosure.
Figure 2A:
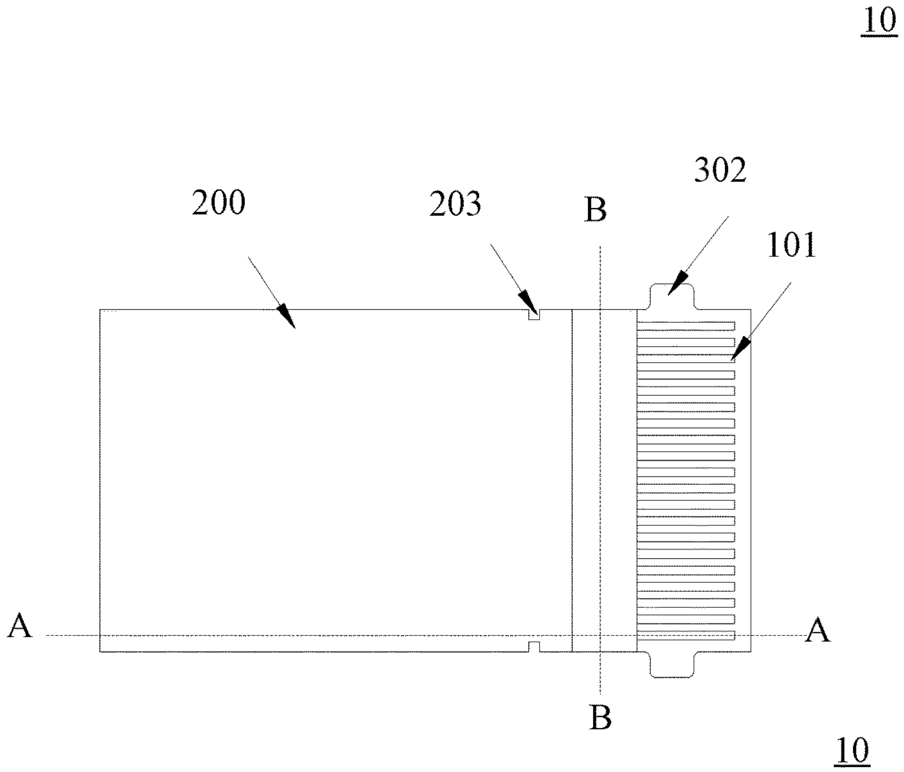
FIG. 2A is a top view of the insert-molded connector according to the first embodiment of the present disclosure.
Figure 2B:
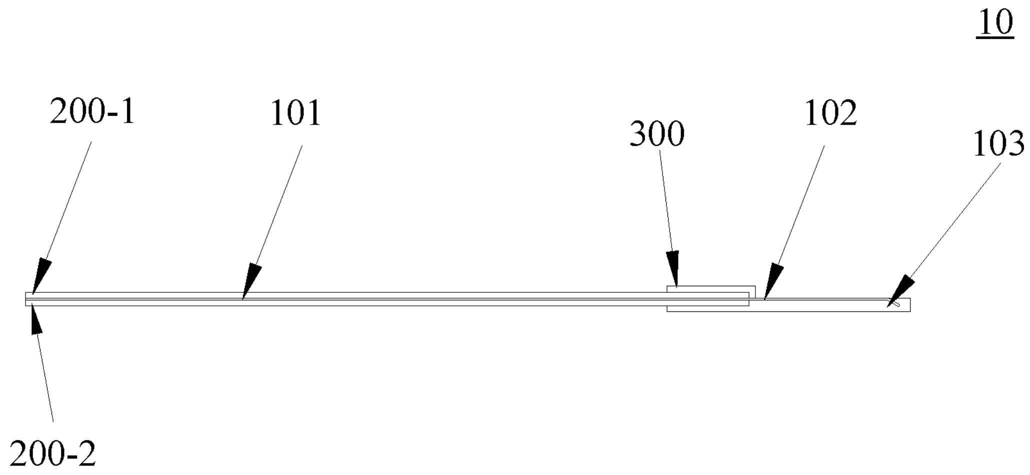
FIG. 2B illustrates a cross-sectional view along the A-A line of FIG. 2A.
Figure 2C:
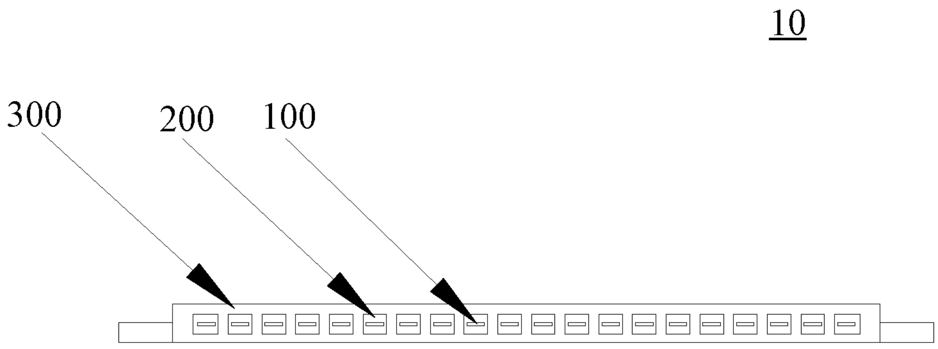
FIG. 2C illustrates a cross-sectional view along the B-B line of FIG. 2A.
Figure 3:
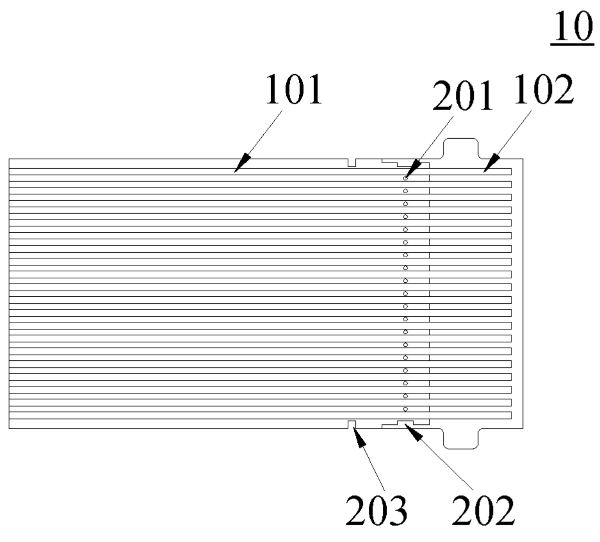
FIG. 3 is a cross-sectional view of the insert molded connector along a plane formed by a plurality of conductors arranged in parallel according to the first embodiment of the present disclosure.

Please refer to FIG. 1, FIG. 2A, FIG. 2B, FIG. 2C and FIG. 3. FIG. 1 is a diagram of an insert molded connector according to a first embodiment of the present disclosure. FIG. 2A is a top view of the insert-molded connector according to the first embodiment of the present disclosure. FIG. 2B illustrates a cross-sectional view along the A-A line of FIG. 2A. FIG. 2C illustrates a cross-sectional view along the B-B line of FIG. 2A. FIG. 3 is a cross-sectional view of the insert molded connector along a plane formed by a plurality of conductors arranged in parallel according to the first embodiment of the present disclosure.

According to the first embodiment of the present disclosure, the insert molded connector 10 comprises a plurality of wires 100 arranged in parallel, a coating insulating layer 200 and a tongue 300. Each of the plurality of wires 100 arranged in parallel includes a main portion 101, a contact portion 102 and an end portion 103. The coating insulating layer 200 includes a fixing through hole 201, a fixing notch 202 and a positioning notch 203. The tongue 300 includes a contact opening 301 and an engaging portion 302.

The wires 100 arranged in parallel are used to transmit electrical signals. For example, the coating insulating layer 200 is used for covering the main portions 101 of the wires 100 and exposing the contact portions 102 of the wires 100. The tongue 300 is formed by insert molding, while covering the contact portion 102 and a portion of the coating insulating layer 200 close to the contact portion 102, such that the contact surface of the contact portion 102 is exposed through the contact opening 301. In addition, the end portions 103 of the wires 100 are not parallel to the contact portion 102. For example, the end portions 103 are bent downward at a certain angle as shown in the FIG. 1, so that the end portions 103 can be embedded into the tongue 300 when the tongue 300 is insert-molded. This structure could strength the fixing strength between the wires 100 and the tongue 300, but the present disclosure is not limited thereto.

As shown in FIG. 2A, FIG. 2B, FIG. 2C and FIG. 3, the wires 100 arranged in parallel are a plurality of flat conductors. That is, the main portion 101, the contact portion 102 and the end portion 103 are an integrated flat conductor. The contact opening 301 of the tongue 300 is used to expose the contact surface of the contact portion 102, which is the upper surface of the contact portion 102 as shown in the figures. Furthermore, a portion of the insulating covering layer 200 close to the contact portion 102 includes at least one fixing through hole 201, so that the tongue 300 is insert-molded into the at least one fixing through hole 201. In the first embodiment, a plurality of circular fixing through holes 201 are provided. A plurality of circular fixing through holes 201 are arranged at equal distances, and the fixing through holes 201 are all arranged between the wires 100 arranged in parallel. When the tongue 300 is insert-molded, the circular fixing through holes 201 are filled to strengthen the fixing strength between the insulating cover layer 200 and the tongue 300.

As shown in FIG. 1, FIG. 2A, FIG. 2B, FIG. 2C and FIG. 3, at least one fixing notch 202 of the coating insulating layer 200 is disposed near the contact portion 102, so that the tongue 300 is insert-molded in the fixing notch 202 for strengthening the fixing strength between the coating insulating layer 200 and the tongue 300. In the first embodiment, the fixing notch 202 is disposed on both sides of the coating insulating layer 200 near the contact portion 102, and its shape is a rectangle. The positioning notches 203 of the coating insulating layer 200 are arranged on both sides of the coating insulating layer 200 and are used for the positioning of automatic equipment during the manufacturing process of the insert molding connector 10. In the first embodiment, as shown in FIG. 1, FIG. 2A, FIG. 2B, and FIG. 2C, the contact opening 301 of the tongue 300 is disposed correspondingly to the contact portion 102 of the wire 100. When the tongue 300 is insert-molded, the contact surface of the contact portion 102 is exposed. The engaging portions 302 of the tongue 300 are located on both sides of the contact portion 102, and are used for snapping and fixing the board end connector (not shown) disposed on the circuit board.

In the first embodiment, as shown in FIGS. 2A-2C, the coating insulating layer 200 includes an upper coating film layer 200-1 and a lower coating film layer 200-2. The material of the coating insulating layer 200 is selected from polyester, polyimide, polyethylene, polypropylene, polytetrafluoroethylene (PTFE), acrylic or liquid crystal polymer plastics, and the material of the insert-molded tongue 300 is selected from polyester, polyimide, polyethylene, polypropylene, PTFE, acrylic or liquid crystal polymer plastics. The upper coating film layer 200-1 and the lower coating film layer 200-2 can be formed by thermocompression. As shown in FIG. 1, FIG. 2A, FIG. 2B, FIG. 2C and FIG. 3, the upper coating film layer 200-1 and the lower coating film layer 200-2 cover the main portions 101 of the wires 100 from the above and below and expose the contact portions 102 of the wires 100. It should be noted that the temperature resistance of the coating insulating layer 200 is higher than the temperature of the insert molding process of the tongue 300. That is, the resistance temperature of the upper coating film layer 200-1 and the lower coating film layer 200-2 is higher than the insert molding process temperature of the tongue 300. Therefore, the present disclosure can maintain the physical, chemical and electrical characteristics of the coating insulating layer 200 in the subsequent insert molding process of the tongue 300 by virtue of the high temperature resistance of the coating insulating layer 200. That is, after the tongue 300 is insert-molded, the original physical, chemical and electrical states of the insulating covering layer 200 will not be affected by the high temperature of the insert-molding process. Accordingly, an insert-molded connector with a simple structure and a high reliability is created.

Figure 4:
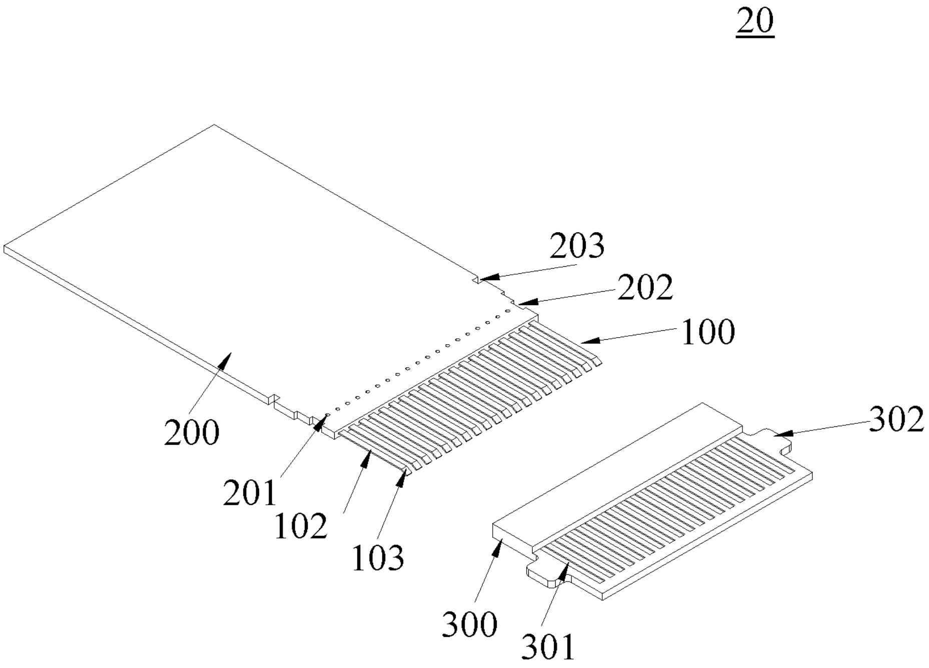
FIG. 4 is a diagram of an insert molded connector according to a second embodiment of the present disclosure.
Figure 5A:
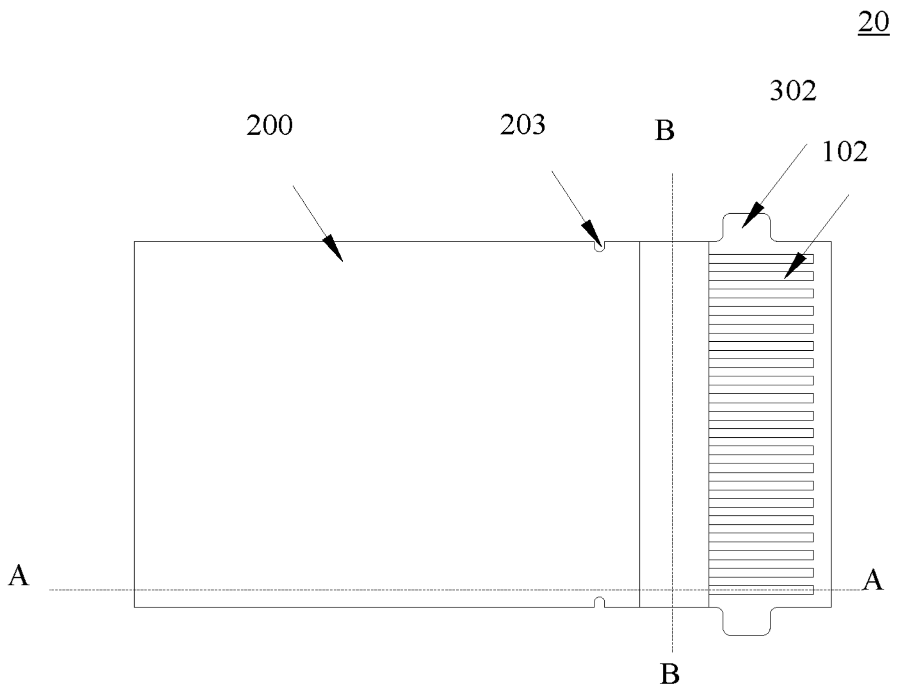
FIG. 5A is a top view of the insert-molded connector according to the second embodiment of the present disclosure.
Figure 5B:
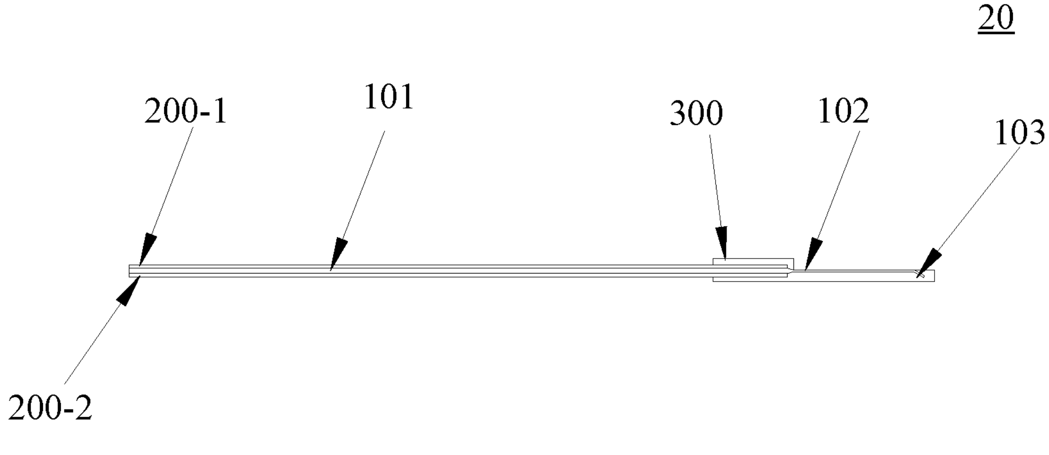
FIG. 5B illustrates a cross-sectional view along the A-A line of FIG. 5A.
Figure 5C:
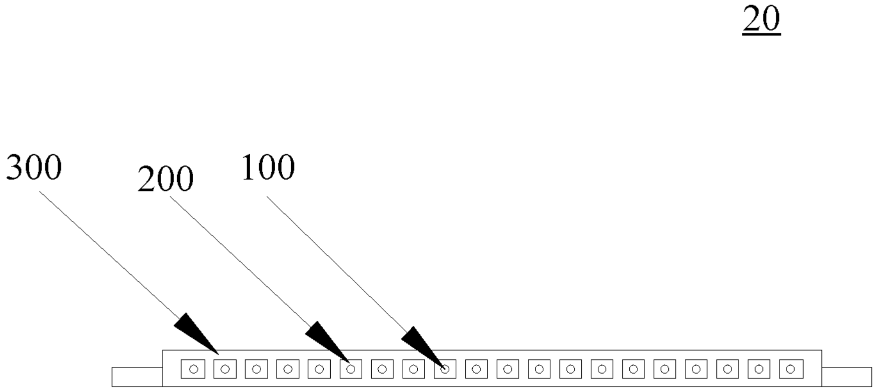
FIG. 5C illustrates a cross-sectional view along the B-B line of FIG. 5A.
Figure 6:
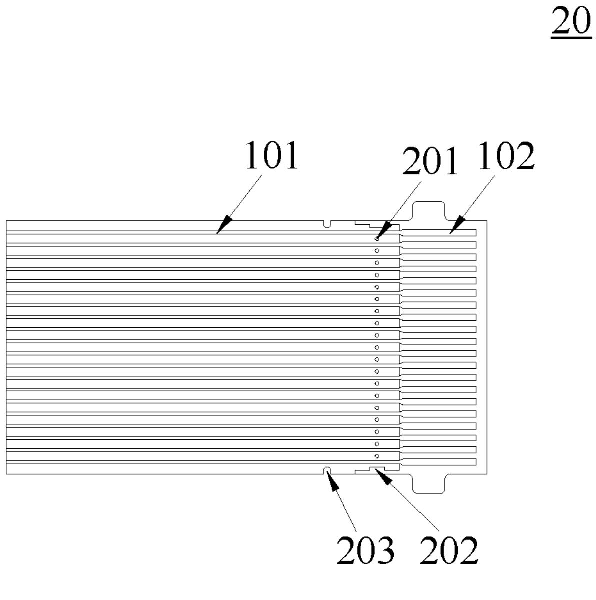
FIG. 6 is a cross-sectional view of the insert molded connector along a plane formed by a plurality of conductors arranged in parallel according to the second embodiment of the present disclosure.

Please refer to FIG. 4, FIG. 5A, FIG. 5B, FIG. 5C and FIG. 6. FIG. 4 is a diagram of an insert molded connector according to a second embodiment of the present disclosure. FIG. 5A is a top view of the insert-molded connector according to the second embodiment of the present disclosure. FIG. 5B illustrates a cross-sectional view along the A-A line of FIG. 5A. FIG. 5C illustrates a cross-sectional view along the B-B line of FIG. 5A. FIG. 6 is a cross-sectional view of the insert molded connector along a plane formed by a plurality of conductors arranged in parallel according to the second embodiment of the present disclosure. According to the second embodiment of the present disclosure, the insert-molded connector 20 also comprises a plurality of wires 100 arranged in parallel, a coating insulating layer 200 and a tongue 300. Each of the plurality of wires 100 arranged in parallel includes a main portion 101, a contact portion 102 and an end portion 103. The coating insulating layer 200 includes a fixing through hole 201, a fixing notch 202 and a positioning notch 203. The tongue 300 includes a contact opening 301 and an engaging portion 302.

Please refer to FIG. 4, FIG. 5A, FIG. 5B, FIG. 5C and FIG. 6. The difference between the insert-molded connector 20 of the second embodiment and the insert-molded connector 10 of the first embodiment is: the main portions 101 of the parallel-arranged wires 100 are a plurality of circular conductors, and the contact portions 102 of the parallel-arranged wires 100 are the extension of the main portions 101 and are originally circular but becomes flat conductors by applying an external force to it (for example, knocking it flat). Similarly, each of the end portions 103 is also a flat conductor, which is formed by bending the front end of the contact portion 102. In the second embodiment, the shape of the positioning notch 203 for automated positioning can be a circle, a semi-circle or other shapes suitable for the automated equipments. However, the shape of the positioning notch 201 is not limited thereto.

Figure 7:
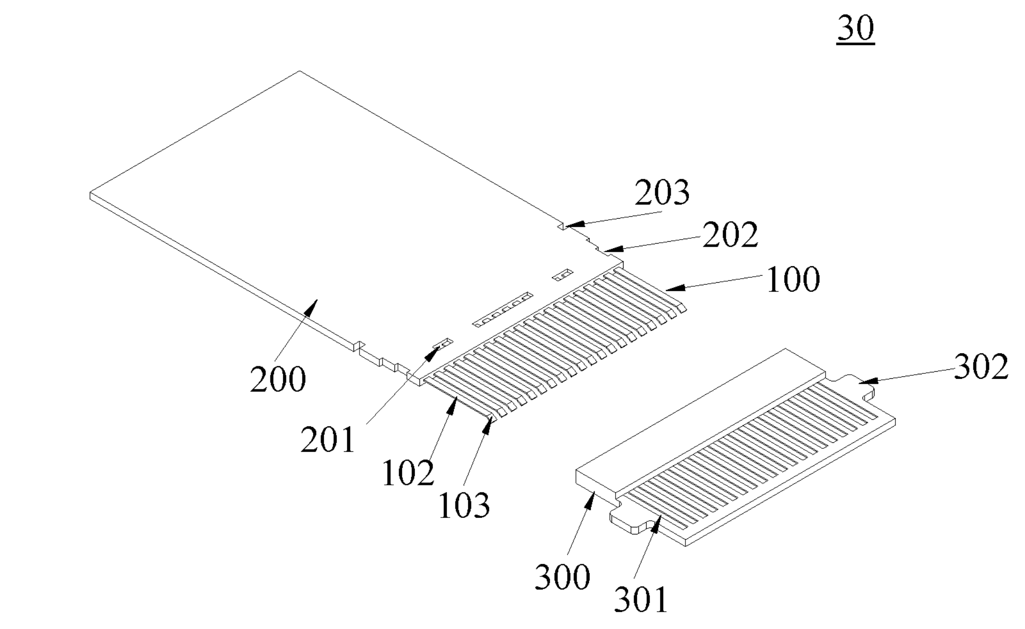
FIG. 7 is a diagram of an insert molded connector according to a third embodiment of the present disclosure.
Figure 8A:
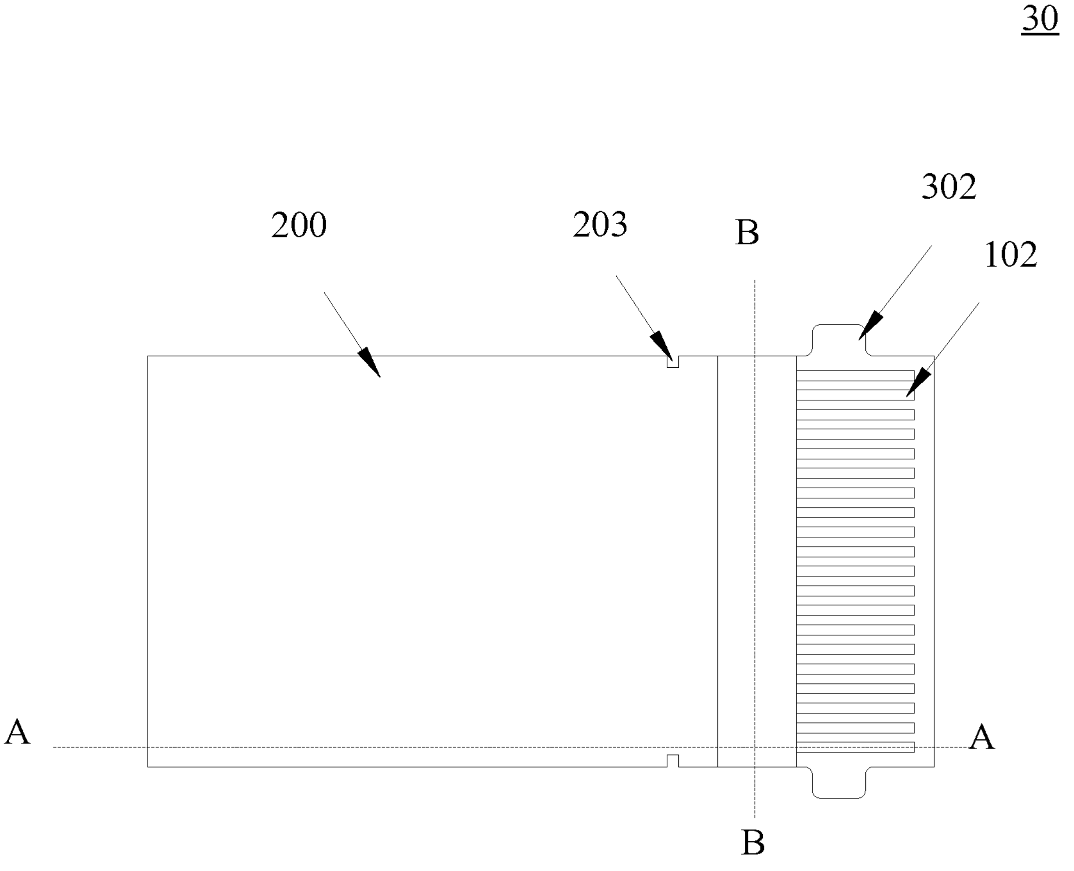
FIG. 8A is a top view of the insert-molded connector according to the third embodiment of the present disclosure.
Figure 8B:
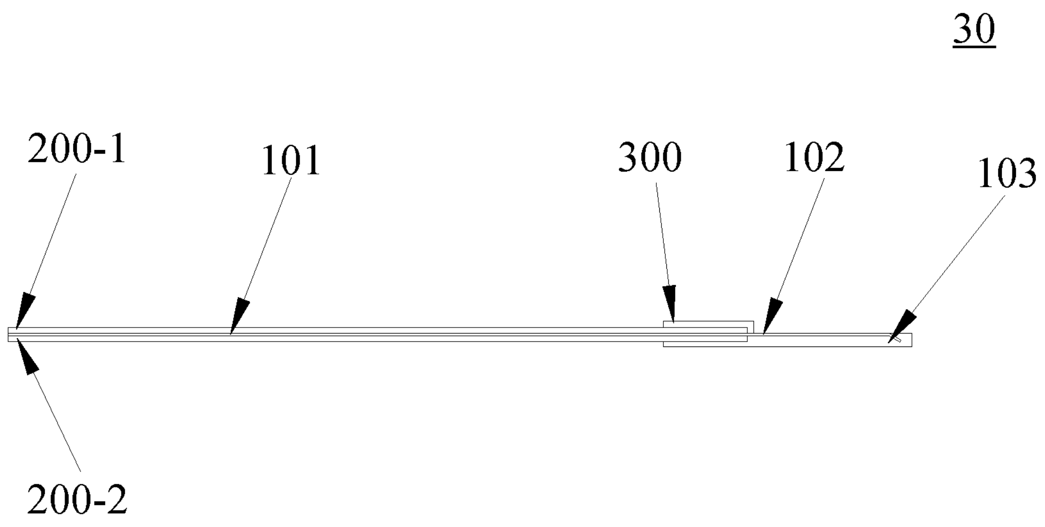
FIG. 8B illustrates a cross-sectional view along the A-A line of FIG. 8A.
Figure 8C:
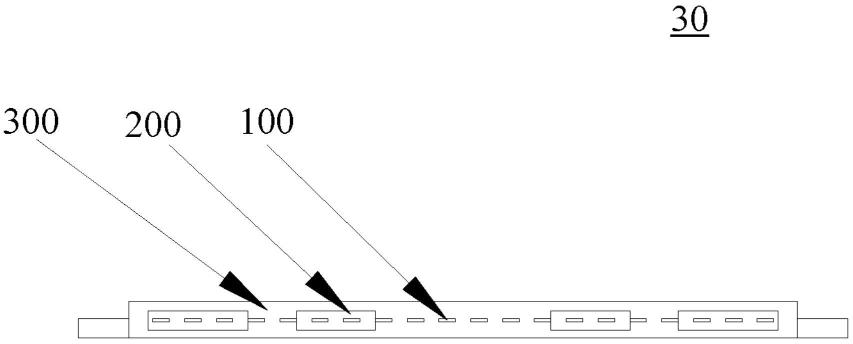
FIG. 8C illustrates a cross-sectional view along the B-B line of FIG. 8A.
Figure 9:
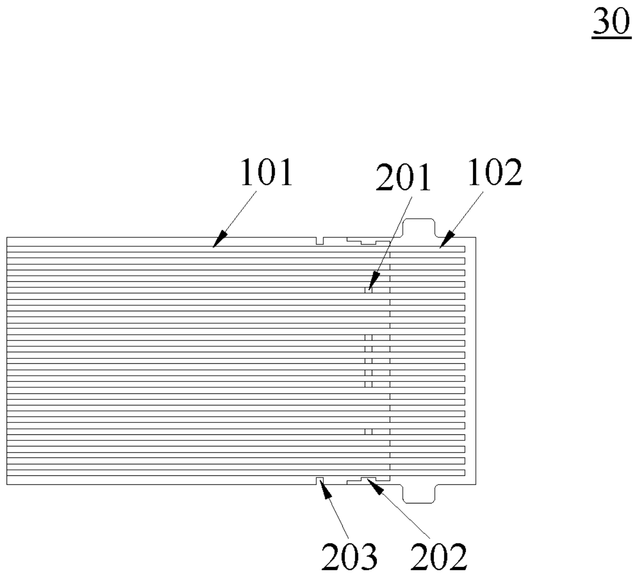
FIG. 9 is a cross-sectional view of the insert molded connector along a plane formed by a plurality of conductors arranged in parallel according to the third embodiment of the present disclosure.

Please refer to FIG. 7, FIG. 8A, FIG. 8B, FIG. 8C and FIG. 9. FIG. 7 is a diagram of an insert molded connector according to a third embodiment of the present disclosure. FIG. 8A is a top view of the insert-molded connector according to the third embodiment of the present disclosure. FIG. 8B illustrates a cross-sectional view along the A-A line of FIG. 8A. FIG. 8C illustrates a cross-sectional view along the B-B line of FIG. 8A. FIG. 9 is a cross-sectional view of the insert molded connector along a plane formed by a plurality of conductors arranged in parallel according to the third embodiment of the present disclosure. According to the second embodiment of the present disclosure, the insert-molded connector 30 comprises a plurality of wires 100 arranged in parallel, a coating insulating layer 200 and a tongue 300. Each of the plurality of wires 100 arranged in parallel includes a main portion 101, a contact portion 102 and an end portion 103. The coating insulating layer 200 includes a fixing through hole 201, a fixing notch 202 and a positioning notch 203. The tongue 300 includes a contact opening 301 and an engaging portion 302.

Please refer to FIG. 7, FIG. 8A, FIG. 8B, FIG. 8C and FIG. 9. The difference between the insert-molded connector 30 of the third embodiment and the insert-molded connector 10 of the first embodiment is: the insert molding connector 10 of the first embodiment has a plurality of circular fixing through holes 201. In contrast, the insert molding connector 30 has a plurality of rectangular fixing through holes 201 in the coating insulating layer 200 near the contact portion 102. Please note, the present disclosure does not limit the number and/or the length of the through holes as long as portions of the main portions 101 of the wires 100 covered by the coating insulating layer can be exposed as shown in FIG. 7, FIG. 8A, FIG. 8B, FIG. 8C and FIG. 9. After the tongue 300 is insert-molded, the insert-molding strength of the tongue 300 is further increased. When the tongue 300 is insert-molded, the rectangular through holes 201 are filled to strengthen the fixing strength between the coating insulating layer 200 and the tongue 300.

In contrast to the conventional art, the insert molded connector of the present disclosure can maintain the original physical, chemical and electrical characteristics by implementing the insert molding process due to the high temperature resistance of the coating insulating layer 200. While directly forming the tongue 300 that covers and holds the contact portion 102 and the partial coating insulating layer 200, there is no need to insert molding the independent contact portion (transmission terminal) first. That is, the tongue is completed first, and then the transmission contact (transmission terminal) is welded to the welding portion of the flexible flat cable with the coating insulating layer, so as to create an insert molding connector with a very simple structure and high reliability.

Above are embodiments of the present disclosure, which does not limit the scope of the present disclosure. Any modifications, equivalent replacements or improvements within the spirit and principles of the embodiment described above should be covered by the protected scope of the disclosure.

What is claimed is:

1. An insert molded connector, comprising:

a plurality of wires arranged in parallel, configured to transmit electrical signals;

a coating insulating layer, covering main portions of the wires to expose a plurality of contact portions of the wires, wherein at least one fixing through hole is formed on the coating insulting layer close to the contact portions; and a tongue, insert molded to cover the contact portions and a portion of the coating insulating layer close to the contact portions to expose a contact surface of each of the contact portions, such that the wires extend from the coating insulating layer to be embedded into the tongue, and the contact surfaces of the contact portions of the wires are exposed at the tongue, wherein the at least one fixing through hole is filled with a material of the tongue.

2. The insert molded connector of claim 1, wherein the wires are a plurality of flat conductors.

3. The insert molded connector of claim 1, wherein the main portions of the wires are a plurality of circular conductors, and the contact portions of the wires are flat conductors.

4. The insert molded connector of claim 1, wherein each of the wires further comprise an end portion, which is not parallel to the contact portion, so as to be embedded in the tongue portion during insert-molding.

5. The insert molded connector of claim 1, wherein the coating insulating layer comprises an upper coating film layer and a lower coating film layer.

6. The insert molded connector of claim 5, wherein the upper coating film layer and the lower coating film layer are formed by thermocompression to cover the main portion of the wires.

7. The insert molded connector of claim 1, wherein a portion of the coating insulating layer close to the contact portion comprises at least one fixing through notch, so that the tongue is insert-molded in the at least one fixing through notch.

8. The insert molded connector of claim 1, wherein the tongue further comprises engaging portions located on both sides.

9. The insert molded connector of claim 1, wherein the tongue further comprises a contact opening, configured to expose the contact surface of the contact portion during insert-molding.

10. The insert molded connector of claim 1, wherein the coating insulating layer further comprises positioning notches on both sides.

11. The insert molded connector of claim 1, wherein a withstand temperature of the coating insulating layer is higher than an insert-molding temperature of the tongue.

12. The insert molded connector of claim 1, wherein a material of the coating insulating layer is selected from polyester, polyimide, polyethylene, polypropylene, polytetrafluoroethylene, acrylic or liquid crystal polymer plastics.

13. The insert molded connector of claim 1, wherein a material of the tongue is selected from polyester, polyimide, polyethylene, polypropylene, polytetrafluoroethylene, acrylic or liquid crystal polymer plastics.

* * * * *